United States Patent Office 3,254,133
Patented May 31, 1966

3,254,133
PROCESS FOR PREPARING PURE BERYLLIUM DIALKYLS
Giorgio Moretti and Alfredo Turchi, Ferrara, Italy, assignors to Montecatini Società Generale per l'Industria Mineraria e Chimica, a corporation of Italy
No Drawing. Filed Feb. 14, 1962, Ser. No. 173,132
Claims priority, application Italy, Feb. 17, 1961, 2,842/61
7 Claims. (Cl. 260—665)

The present invention relates to a process for preparing pure beryllium dialkyls.

In Italian patent application No. 19,466/60, now Italian Patent No. 639,147, there is described a process for readily preparing beryllium alkyl halides in good yields by treating beryllium dihalides with approximately equimolar amounts of aluminum trialkyls. Beryllium alkyl halides and aluminum dialkyl monohalides are thus obtained. The latter compounds can be easily separated.

The reaction between beryllium halides and aluminum trialkyls leads to an equilibrium resulting in the formation of beryllium dialkyls as well as beryllium alkyl halides. The higher the amount of reacted aluminum trialkyl, the higher the amount of beryllium dialkyl formed.

However, by operating with an amount of beryllium dialkyl and of aluminum trialkyl in molar ratios of 1:1, essentially beryllium alkyl halides are obtained.

The aluminum dialkyl monohalide which is also formed can be separated by vacuum distillation or by dissolution in a low-boiling solvent, preferably aliphatic, at room temperature. The beryllium alkyl halides are not volatile and only very slightly soluble in such solvents at room temperature, so they remain as solid residue.

In Italian patent application No. 19,466/60 it was also specified that beryllium dialkyls can be obtained in good yields from beryllium alkyl halides by reacting them with a hydride of a metal more electropositive than beryllium and then adding ethylene or other olefins.

Upon reaction of a beryllium alkyl halide with a metal hydride, a metal halide is formed and at the same time a beryllium alkyl hydride. The beryllium alkyl hydride is then transformed into a beryllium dialkyl by addition of the olefin.

The reaction is carried out in the presence of a solvent in which the beryllium alkyl halide is completely soluble (e.g., ethyl ether) or partially soluble (e.g., toluene or heptane).

This reaction, however, is very slow in practice due to the insolubility of most of the hydrides of the metals more electropositive than beryllium, e.g., NaH, in such said solvents.

It is also known that the dehalogenation of a beryllium alkyl halide is highly accelerated by adding a certain amount of an aluminum trialkyl, which thereupon complexes the metal hydride forming a complex which is liquid above a given temperature and is soluble in the reaction medium.

For instance triethyl aluminum forms a complex with NaH which is soluble at a temperature higher than 50° C.

Moreover, it is not even necessary to use the stoichiometric amount of aluminum trialkyl with respect to the metal hydride in order to form such a complex.

If, e.g., we consider the dehalogenation of beryllium ethyl chloride according to the reaction:

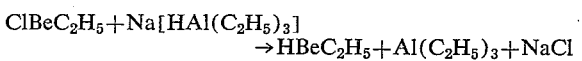

further aluminum triethyl is formed as the reaction proceeds and it immediately complexes and solubilizes further NaH, until the reaction is completed, i.e., all of the NaH or all of the beryllium ethyl chloride has reacted in accordance with the above equation.

Also in this case the reaction is carried out in a dispersing medium comprising an aliphatic or aromatic hydrocarbon. At the end of the dehalogenation reaction the olefin is added to the beryllium alkyl hydride and, by successive distillation under vacuum, the aluminum trialkyl and beryllium dialkyl can be recovered.

A mixture of both organometallic compounds is, thus obtained. Separation of these two compounds by fractional distillation is, if possible, very difficult because, in order to distill the easily decomposable beryllium dialkyls, it is necessary to operate under a very reduced pressure, and the boiling points of the two metalorganic compunds containing the same alkyl radicals are rather close.

We have now surprisingly found that high purity beryllium dialkyls can be obtained from a mixture of aluminum trialkyls and beryllium dialkyls by adding an electron-donor compound capable of forming, with the aluminum trialkyls, a non-volatile complex which can be distilled only at a temperature much higher than the boiling point of beryllium dialkyl, thereby permitting separation by distillation under a high vacuum.

The present invention therefore comprises a process for preparing beryllium dialkyls in the pure state from a mixture containing substantially a beryllium dialkyl and organic aluminum compounds these compounds having been obtained by complete alkylation of a beryllium dihalide according to the process of the aforesaid patent application. To this mixture is added an electron-donor compound, this electron-donor compound being capable of forming with the organic aluminum compounds a complex which is not volatile or which can be distilled only under a high vacuum (lower than 0.1 mm. Hg) and at a temperature which is at least 30° C. higher than the boiling point of the beryllium dialkyl. The pure beryllium dialkyl is then separated by distillation, under reduced pressure, from the complex formed.

Suitable electron-donor compounds include certain organic compounds of elements belonging to Groups V and VI of the Periodic Table, more particularly, organic compounds from such groups and containing nitrogen, phosphorus, arsenic, antimonium, bismuth, oxygen or sulfur, and which are capable of forming complexes with metalorganic compounds of metals belonging to Group I, II or III of the Periodic Table.

Tertiary amines or organic nitrogen bases, trialkyl phosphines, arsines, stybines and bismuthines, ethers and thioethers have all been found to be suitable for this purpose. Particularly suitable are quinoline, isoquinoline, hexahydromethylaniline, dimethylaniline, diethylaniline, diamylether, diheptylether, dihexylsulphide, diheptylsulphide, dimethylphenylphosphine, triphenylphosphine, dimethylphenylarsine, dimethylphenylstibine, triphenylstibine, triphenylbismuthine.

It should be noted that beryllium dialkyls also form complexes with some of the said electron-donor compounds, but these complexes are much less stable than the corresponding complexes with aluminum trialkyls.

Therefore, if molar amounts of complexing substance at least equal to the aluminum trialkyl molar amount present are added to an aluminum trialkyl-beryllium dialkyl mixture, the electron-donor substance preferentially forms a complex with aluminum trialkyl; by using a small excess (about 10%) it is possible to complex all of the aluminum trialkyl and to obtain, by distillation under a high vacuum, a clear separation of the aluminum trialkyl-electron donor compound complex from beryllium dialkyl.

Obviously, the selected electron donor must give a complex (with aluminum trialkyl) having a much higher boiling point than beryllium dialkyl, even under a high vacuum.

The following example will further illustrate our invention.

*Example*

119 g. of $BeCl_2$ (1.485 moles) are introduced into a 3-necked flask provided with a central agitator and connected with a distillation column, and 185 g. of aluminum triethyl are successively added dropwise from a separating funnel.

When the addition of metalorganic compound is completed, the whole is heated to 100° C. in an oil bath and is agitated at this temperature for 1 hour.

All the above described operations have been carried out under an inert gas such as nitrogen.

The mixture is then cooled and distilled under a high vacuum (0.1 mm. Hg) by gradually heating the bath up to 100° C.

176 g. of a product containing 22.3% of Al, 0.24% of Be and 28.37% of Cl, are obtained.

By decomposition with 2-ethylhexyl alcohol, this product develops a gas consisting almost exclusively of ethane. The distilled product therefore consists almost exclusively of aluminum diethyl monochloride.

To the solid distillation residue, 500 cc. of anhydrous toluene, 92 g. (0.81 mole) of aluminum triethyl and 75 g. of a 52.7% NaH dispersion in petroleum (in which 1.64 mols of NaH are present) are added.

The whole is heated to 100° C. for 5 hours while vigorously stirring. After this time the powdery solid is left to deposit and a sample of clear liquid is withdrawn, and analyzed: Cl appears to be absent.

The suspension is siphoned into a 2-litres vertical autoclave provided with anchor-agitator, manometer, valves for introducing gas, and a thermometer sheath, and immersed in an oil bath. It is heated to 70° C. for 2 hours while agitating and maintaining an ethylene pressure in the autoclave of 5 to 7 atmospheres.

The suspension is discharged, the solvent is evaporated, and the liquid metalorganic compounds are recovered by distillation under a high vacuum (0.01 mm. Hg).

160 g. of a product containing 11.1% of aluminum and 6.83% of beryllium (Cl is absent) are recovered.

By decomposition with 2-ethylhexyl alcohol, a gas essentially consisting of ethane is developed. The mixture therefore consists of 1.2 moles of beryllium diethyl and 0.66 moles of aluminum triethyl.

To this mixture, 95 g. of anhydrous quinoline (0.75 moles), which corresponds to an excess of approximately 10% with respect to the aluminum triethyl present are added and the whole is heated to 80° C. for 1 hour while agitating.

A rather thick yellow liquid is obtained. 161 g. of this liquid product (from a total of 255 g.) are distilled in a thin-layer distillation apparatus under a vacuum of 0.005 mm. Hg, heating the hot wall to 70–80° C.

38 g. of distillate are obtained which distillate contains 12% of beryllium and is free of Cl and Al.

By decomposition with 2-ethyl hexyl alcohol this product evolves a gas consisting essentially of ethane. The product is therefore pure $Be(C_2H_5)_2$.

Variations can of course be made without departing from the spirit of our invention.

Having thus described our invention, what we desire to secure and hereby claim is:

1. A process for preparing a high purity beryllium dialkyl comprising adding to a mixture containing substantially a beryllium dialkyl and an aluminum trialkyl, said beryllium dialkyl and aluminum trialkyl having been obtained by total alkylation of a beryllium halide, an electron donor compound capable of forming with said aluminum trialkyl a complex which is nonvolatile and distillable only under a vacuum lower than 0.1 mm. Hg and at a temperature of at least 30° C. higher than the boiling point of said beryllium dialkyl, said electron-donor compound being selected from the group consisting of quinoline, isoquinoline, hexahydromethylaniline, dimethylaniline, diethylaniline, diamylether, diheptylether, dihexylsulphide, diheptylsulphide, dimethylphenylphosphine, triphenylphosphine, dimethylphenylarsine, dimethylphenylstibine, triphenylstibine, and triphenylbismuthine, and separating the beryllium dialkyl from the thus-formed complex by distillation.

2. The process of claim 1 wherein said beryllium halide is beryllium chloride.

3. The process of claim 1 wherein said beryllium dialkyl is beryllium diethyl.

4. The process of claim 1 wherein said electron-donor compound is quinoline.

5. The process of claim 1 wherein the electron-donor compound is added in excess with respect to the stoichiometric amount.

6. The process of claim 5 wherein said excess is about 10%.

7. The process of claim 1 wherein said electron-donor compound is isoquinoline.

References Cited by the Examiner

UNITED STATES PATENTS

| | | | |
|---|---|---|---|
| 2,826,598 | 3/1958 | Ziegler et al. | 260—429 |
| 3,119,854 | 1/1964 | Ziegler et al. | 260—448 |

TOBIAS E. LEVOW, *Primary Examiner.*

E. C. BARTLETT, *Assistant Examiner.*